UNITED STATES PATENT OFFICE.

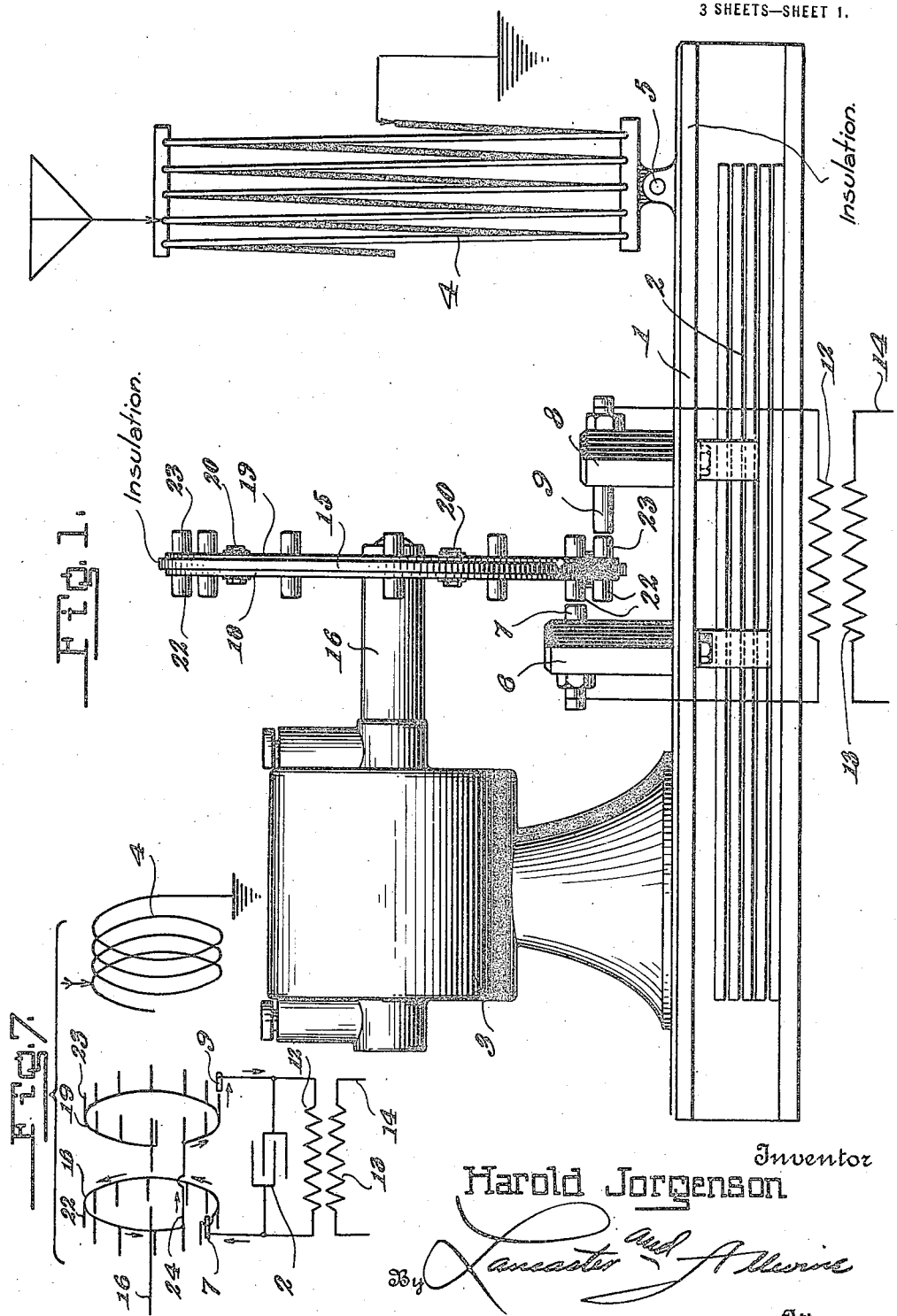

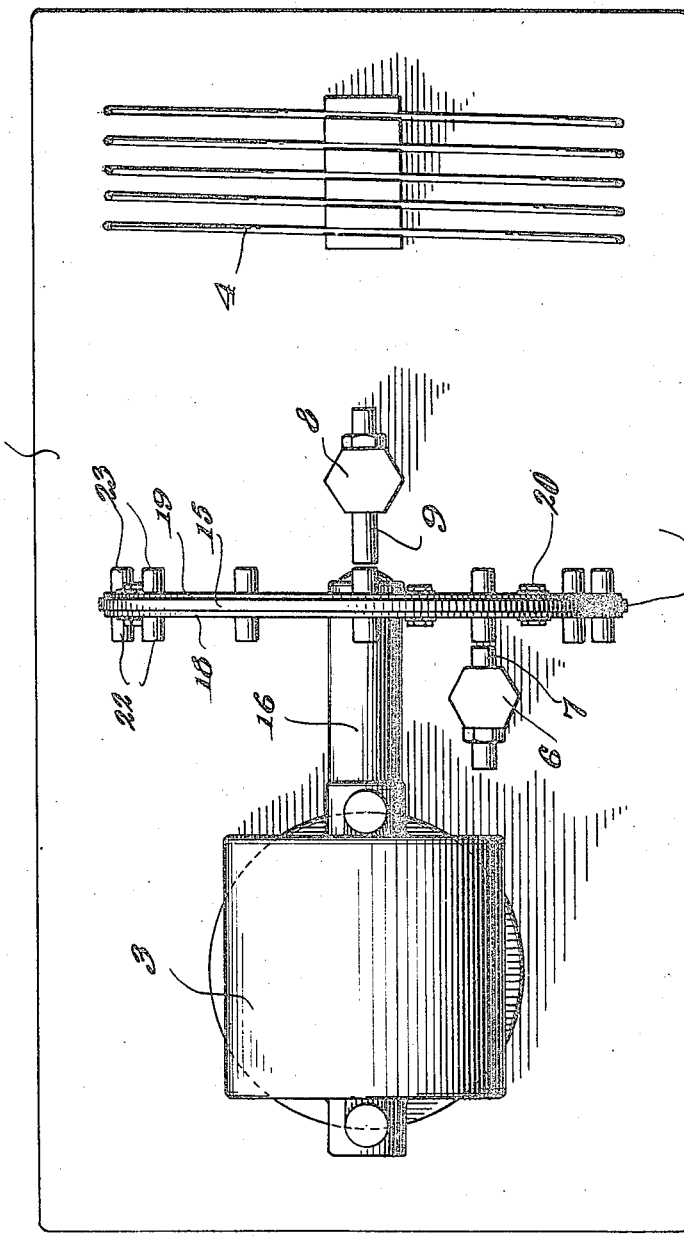

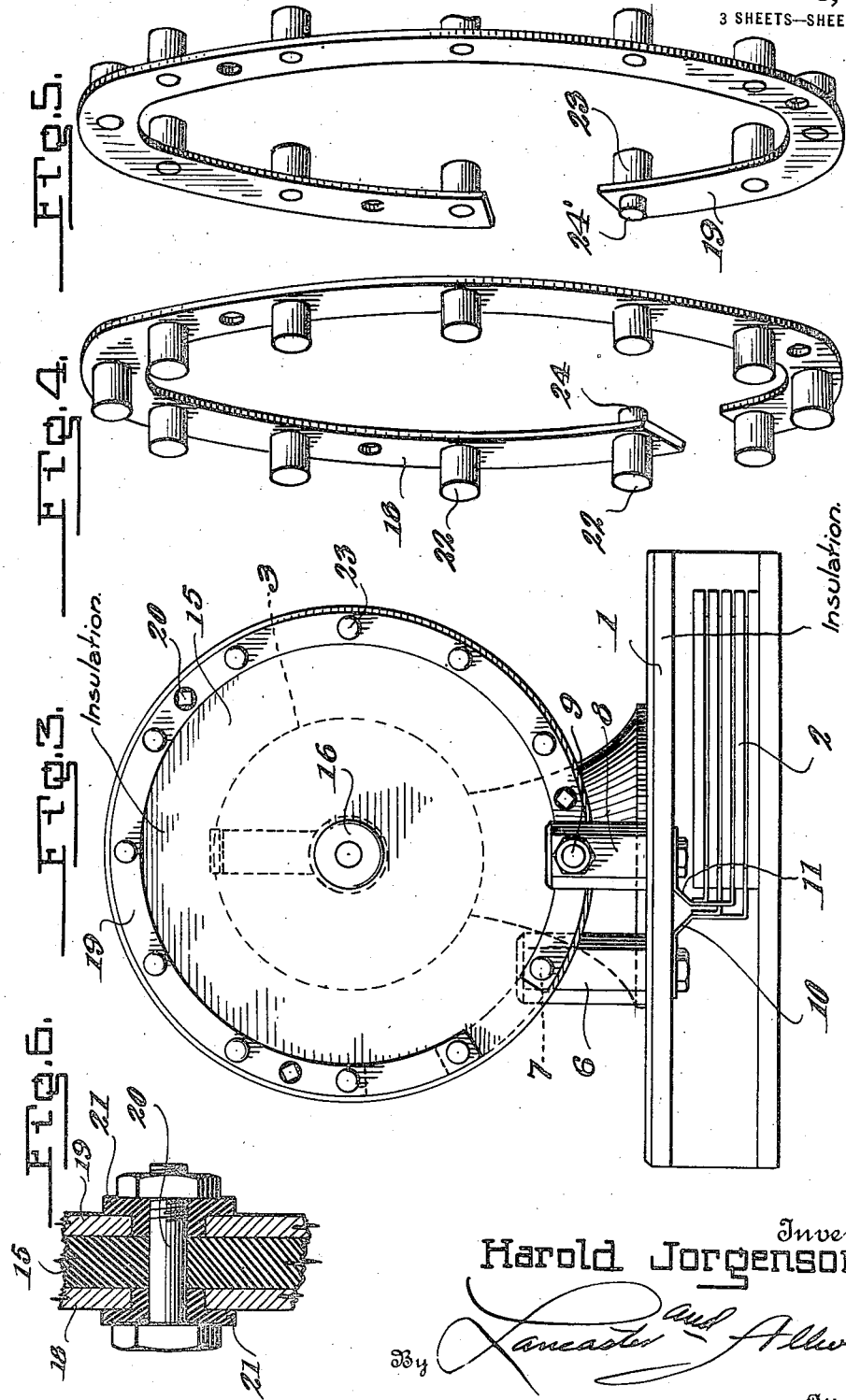

HAROLD JORGENSON, OF RACINE, WISCONSIN.

OSCILLATION GENERATOR.

1,402,235.   Specification of Letters Patent.   Patented Jan. 3, 1922.

Application filed January 22, 1920. Serial No. 353,199.

*To all whom it may concern:*

Be it known that I, HAROLD JORGENSON, a citizen of the United States, residing at Racine, in the county of Racine and State of Wisconsin, have invented certain new and useful Improvements in Oscillation Generators, of which the following is a specification.

This invention relates to an apparatus especially useful in wireless telegraphy, but capable of use for kindred purposes, for the production of high frequency oscillations which are continuous or approximately so.

In ordinary oscillating generators now used, there is employed a spark gap device, a condenser and a helix or induction element, which are separate and distinct units, requiring more or less space, and metallic connections for connecting said elements in a closed resonant oscillatory circuit, as well known in the art, and this invention has for its primary object to reduce the space required for such apparatus and to also eliminate connections and other parts, by bringing said elements into operative relation in a novel manner to perform duty in a highly efficient manner, and providing oscillations of greater power.

Another object is to combine the spark gap device and helix or induction element, whereby simplicity and compactness is afforded, by reducing such mechanism to a very simple and compact arrangement, as well as being capable of inducing oscillations of increased power as compared with ordinary devices of this kind.

A still further object is the combination with a rotary spark gap device of a helix or induction element, whereby they constitute a single unit, to give added efficiency by eliminating leads and connections, as well as reducing the space required.

The present apparatus is intended particularly for use in amateur radio transmitters which are restricted to relatively short wave lengths, although the generator can be used for larger apparatus and for other purposes for which electrical oscillations are required. The present apparatus eliminates the use of conducting leads or connections between the units as now required, thereby increasing the efficiency of the outfit, and the arrangement permits of the use of a larger condenser or capacity so that the power of the radiated wireless waves is increased, but still keeping within the requirements of wave lengths.

By the present arrangement, the outfit can be constructed in a compact manner, which is especially useful when space is limited, such as on airships.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a side elevation of the oscillation generator, portions being shown diagrammatically.

Fig. 2 is a plan view thereof.

Fig. 3 is an end view, with the aerial or antenna coil removed.

Figs. 4 and 5 are perspective views of the combined helix and sparking members, on an enlarged scale.

Fig. 6 is a sectional detail of the rotating spark and helix disk, showing the manner of fastening the members of Figs. 4 and 5 thereto.

Fig. 7 is a diagrammatical view of the electrical equipment.

The invention is illustrated as being used in a wireless transmission outfit, but can obviously be used for other purposes requiring high frequency oscillations. In carrying out the invention there is used a hollow base 1 in which is disposed a condenser or capacity 2 of any suitable kind, which may be of larger capacity than ordinarily used, whereby to give added power to waves radiated. On this base is mounted a suitable motor 3 or other prime mover, and a coil or helix 4 is also mounted on said base, preferably by means of a pivotal mounting 5 enabling said coil to be tilted to different angles for tuning the set in the ordinary manner. This coil 4 is the secondary of an induction couple, and is disposed in the open aerial or antenna circuit, whereby the oscillations are induced in such circuit.

A pair of terminal posts 6 and 8 is mounted on the base 1, and carries the respective sparking points 7 and 9 offset from one another, as seen in Figs. 2 and 3. The terminals 10 and 11 of the condenser or capacity 2 are connected to the respective posts 6 and 8 so as to be in electrical connection with the respective sparking points 7 and 9, and the secondary winding 12 of a transformer also has its terminals connected to said sparking points 7 and 9, whereby electrical potential will be impressed in the closed resonant oscillatory circuit of the winding or coil 12 and condenser 2, by induction from the main winding or coil 13 of the transformer which is disposed in the circuit 14 which supplies the electrical energy used for generating the oscillations. It will be noted that the winding or coil 12 is in a closed resonant circuit with the condenser 2, whereby the condenser will accumulate the electrical energy for discharge through the spark gap device which will be presently described.

A rotary spark gap device is shown, being carried by a rotating disk 15 of insulating material, which is mounted, as as 16, to be carried by the armature of the motor 3 substantially coaxial with the coil 4. Disposed on opposite sides of the disk 15 are arcuate segments 18 and 19 which extend through almost a complete circle, having an air gap between their ends. These segments are secured to the disk 15 by means of bolts 20 or the like, which extend through said segments and disk to clamp said parts together, and insulating bushings 21 insulate said bolts from the segments, whereby said segments are insulated from one another with the exception of a single connection therebetween, as will hereinafter more fully appear. The segments 18 and 19 are provided at equally spaced points with outstanding sparking points 22 and 23, respectively, each segment having an air gap or interruption between two of the sparking points, so that current cannot flow in one segment as a closed circuit. The sparking points 22 and 23 of the disk move past the respective stationary sparking points 7 and 9, with a spark gap at each side of the disk, air acting as a dielectric between the sparking points. One of the sparking points 22 coincides or registers with the sparking point 7 at the same time that one of the sparking points 23 registers or coincides with the sparking point 9. The ends of the two segments 18 and 19 are in overlapping relation, that is, the air gaps of the two segments are offset angularly relatively to one another, and one terminal of one segment is connected to one terminal of the other segment, so as to constitute a helix or coil of an induction element. This obtained by providing the sparking point 22 at one end of the segment 18 and the corresponding sparking point 23 of the segment 19 with shanks 24 which contact with one another through the disk 15. Each segment 18, therefore, not only carries the annular set of sparking points, but also constitutes one convolution of the helix or induction element, whereby the rotating member combines into one unit, a spark gap device and an induction helix or coil. This helix is substantially coaxial with the coil 4, and even though the primary helix rotates with the disk 15 it will induce oscillations in the secondary helix or coil 4.

In operation, the disk 15 is rotated by the motor 3, thereby moving the sparking points of the disk past the stationary sparking points in succession, and making and breaking the electrical connections between the moving and stationary sparking points. Thus, when the sparking points 22 and 23 of the disk are out of registration with the sparking points 7 and 9, the electrical energy induced in the closed resonant circuit will charge the condenser 2, and then as the respective sparking points of the disk move into registration with the sparking points 7 and 9, the condenser will be discharged through the sparking device and its helix or induction element. This results from the fact that the current in flowing from one of the stationary sparking points, say the point 7, across the spark gap to one of the sparking points 22 must follow the segment 18 to that end thereof which is connected to the end of the helix 19, and the current must then flow along the segment 19 to that sparking point 23 which registers with the sparking point 9, thereby completing the circuit between the condenser and helix which is composed of the segments 18 and 19. Then, as the sparking points 22 and 23 leave the sparking points 7 and 9, respectively, the helix is removed from the circuit of the condenser, such circuit being opened and closed at intervals, as the sparking points of the disk are moved past the stationary sparking points, and the helix is connected through the spark gaps with the condenser, each time two of the sparking points 22 and 23 of the disk register with the sparking points 7 and 9, and the current will traverse one convolution of the helix each time, owing to the offsetting of the sparking points 7 and 9, and the angular offsetting of the segments. Thus, with any two sparking points of the disk registering with the stationary sparking points, one convolution of the helix is connected in the circuit, so that the inductive relation between the helix of the disk 15 and coil 4 will not be disturbed, thereby maintaining the induced oscillations uniform. The induction helix of the resonant circuit of the condenser or capacity 2 is thus carried by the rotary disk of the spark gap device as a unit therewith, and the convolutions of the helix comprise the segments which carry the movable sparking points. This combines in one unit the induction helix and sparking device, and providing a very simple and compact structure which is thoroughly efficient, and by the elimination of leads and connections, and by the use of a larger condenser, the waves given off will be more powerful than with an equivalent oscillation generator now used, wherein the spark device and helix are separate units. The apparatus is especially desirable when compactness and simplicity are essential, as in a transmitting set for airships, and the like, and provides an especially desirable construction for use in amateur outfits.

The transmitter embodying the present improvements is always in resonance no matter what pair of movable contacts are presented to the stationary contacts.

Having thus described the invention, what is claimed as new is:—

1. An oscillation generator unit comprising a coil, an induction element movable with respect to said coil and arranged for inducing oscillations in said coil, sparking electrodes, and sparking electrodes carried by said movable induction element for co-operation with the first named electrodes to bring said element into circuit therewith.

2. An oscillation generator unit comprising a movable helix, sparking eletrodes, and sparking electrodes carried by the convolutions of the helix for cooperation with the first-named electrodes and to bring the helix into the circuit.

3. An oscillation generator unit comprising a helix rotatable about its axis, sparking electrodes, and two sets of sparking electrodes carried by convolutions of the helix to move past the first-named electrodes and to bring the helix into the circuit.

4. An oscillation generator unit comprising a rotatable disk, arcuate segments carried by said disk, sparking electrodes, and sets of sparking electrodes carried by the segments to move past the first-named electrodes, said segments being connected so as to constitute a helix between said sparking electrodes.

5. An oscillation generator including in combination, a condenser, means for charging the condenser, a movable induction element, means for moving said element, sparking electrodes connected to the terminals of the condenser, sparking electrodes carried by said element for cooperating with the aforesaid sparking electrodes to intermittently connect said element in circuit with the condenser, and a secondary coil arranged for the induction of oscillations therein from said element.

6. An oscillation generator comprising in combination, a condenser, means for charging the condenser, a movable helix, means for moving said helix, sparking electrodes connected to the terminals of the condenser, sparking electrodes carried by said helix for movement past the aforesaid sparking electrodes to intermittently make and break the circuit between said helix and condenser, and a coil arranged in inductive relation with said helix.

7. An oscillation generator comprising in combination, a condenser, means for charging the condenser, a helix, means for rotating said helix about its axis, sparking electrodes connected to the terminals of the condenser, two annular sets of sparking electrodes carried by the convolutions of the helix to register in succession with the aforesaid sparking electrodes for making the circuit between the helix and condenser, and a coil disposed in inductive relation with said helix.

8. An oscillation generator comprising a condenser, sparking electrodes connected to the terminals thereof, means for charging the condenser, a disk movable between said electrodes, means for rotating said disk, arcuate segments carried by said disk, annular sets of sparking electrodes carried by said segments for registration in succession with the respective aforesaid sparking electrodes, said segments being connected so as to constitute a helix, and a coil disposed in inductive relation with said helix.

9. An oscillation generator, comprising a base, a condenser within the base, means for charging the condenser, a motor on the base, sparking electrodes on the base connected to the terminals of the condenser, a disk rotated by the motor, arcuate segments carried by the disk, annular sets of sparking electrodes carried by the segments to register with the aforesaid sparking electrodes in succession, the segments being connected so as to constitute a helix, and a coil adjustably mounted on the base, in inductive relation with said helix.

10. An oscillation generator unit comprising a coil, an induction element operable with a continuous movement with respect to said coil and arranged for inducing oscillations therein, and sparking means partially movable with said element to make and break a circuit connection to said element as it is moved and produce sustained oscillations.

11. An oscillation generator comprising a condenser, means for charging the condenser, a rotatable induction helix having a continued movement when in operation, sparking means partially carried with said helix for making and breaking electrical connections between said helix and condenser and producing sustained oscillations, and a coil in inductive relation with said helix.

HAROLD JORGENSON.